(12) United States Patent
Salazar et al.

(10) Patent No.: US 9,053,286 B1
(45) Date of Patent: Jun. 9, 2015

(54) VERIFICATION OF FRACTURED MASK DATA

(71) Applicant: Synopsys, Inc., Mountain View, CA (US)

(72) Inventors: Daniel Salazar, Santiago (CL); John Valadez, Austin, TX (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/225,371

(22) Filed: Mar. 25, 2014

Related U.S. Application Data (60) Provisional application No. 61/804,861, filed on Mar. 25, 2013.

(51) Int. Cl.
| | | |
|---|---|---|
| *G06F 17/50* | (2006.01) | |
| *G03F 1/36* | (2012.01) | |
| *G03F 7/20* | (2006.01) | |
| *G03F 1/00* | (2012.01) | |

(52) U.S. Cl.
CPC ........ *G06F 17/5081* (2013.01); *G06F 2217/06* (2013.01); *G03F 1/36* (2013.01); *G03F 7/705* (2013.01); *G03F 1/144* (2013.01); *G06F 17/5068* (2013.01)

(58) Field of Classification Search
CPC . G06F 17/5068; G06F 17/5081; G03F 1/144; G03F 1/36; G03F 7/705
USPC ..................................................... 716/50–56
See application file for complete search history.

(56) References Cited

U.S. PATENT DOCUMENTS

| | | | | |
|---|---|---|---|---|
| 5,725,974 | A * | 3/1998 | Kawahira | 430/5 |
| 7,650,588 | B2 * | 1/2010 | Ivansen | 716/50 |
| 7,777,204 | B2 * | 8/2010 | Lapanik et al. | 250/492.22 |
| 8,448,098 | B2 * | 5/2013 | Liu et al. | 716/53 |
| 8,828,628 | B2 * | 9/2014 | Fujimura | 430/5 |
| 2008/0231629 | A1 * | 9/2008 | Pai | 345/419 |
| 2009/0187876 | A1 * | 7/2009 | Su et al. | 716/19 |
| 2010/0023914 | A1 * | 1/2010 | Sahouria et al. | 716/19 |
| 2010/0031225 | A1 * | 2/2010 | Ivansen | 716/21 |
| 2012/0252215 | A1 * | 10/2012 | Abe | 438/694 |
| 2012/0281191 | A1 * | 11/2012 | Zable et al. | 355/52 |
| 2013/0252143 | A1 * | 9/2013 | Fujimura et al. | 430/5 |
| 2014/0189614 | A1 * | 7/2014 | Liu et al. | 716/53 |
| 2014/0282304 | A1 * | 9/2014 | Jacques et al. | 716/55 |
| 2015/0020037 | A1 * | 1/2015 | Fujimura | 716/52 |

* cited by examiner

*Primary Examiner* — Stacy Whitmore
(74) *Attorney, Agent, or Firm* — Kilpatrick Townsend & Stockton LLP (57) ABSTRACT

Fractured mask data in variable shape beam format is verified. The fractured mask data and unfractured design data from which the fractured mask data was generated is received, as is at least one control parameter related to the fractured mask data. A filter algorithm is performed with the at least one control parameter as an input. The filter algorithm identifies at least one error in the fractured mask data as compared to the unfractured design data other than approximation differences resulting from a fracture algorithm used to generate the fractured mask data. The at least one error includes an edge shift in the fractured mask data as compared to the unfractured design data that is smaller than a defined value, such as the maximum skew value in certain examples.

20 Claims, 8 Drawing Sheets

| Criteria | Impact |
|---|---|
| Number of processing steps | Lower number of steps generally means faster technique |
| Number of control parameters | Lower number of parameters means less tuning, lower complexity, and easier automation |
| Ability to find the right issues | Any issue not found is a false negative |
| Ability to filter out differences due to approximation | Any uninteresting difference not discarded is a false positive |

| Assumption | Impact |
|---|---|
| Fractured data is only Manhattan or only Manhattan and 45° edges | No all-angled edges are present in the fractured data |
| The fracture process has undergone area verification | Fractured polygons cannot have areas drastically different than their unfractured counterparts, and are therefore similar |

|  | Underover Sizing | Path Implode | Difference Measurement | Measurement Implode |
|---|---|---|---|---|
| Maximum Skew Error | Yes | Yes | Yes | Yes |
| Maximum Spacing | No | No | Yes | Yes |
| ALLOW45 | No | Yes | No | No |

| Issue | Underover Sizing | | Path Implode | | Difference Measurement | | Measurement Implode | |
|---|---|---|---|---|---|---|---|---|
|  | 45 no | 45 yes | 45 no | 45 yes | 45 no | 45 yes | 45 no | 45 yes |
| 1 |  |  | Yes | Yes | Yes | Yes | Yes | Yes |
| 2 |  |  | Yes | Yes | Yes | Yes | Yes | Yes |
| 3 | NA |  | NA | Yes | NA | Yes | NA | Yes |
| 4 | NA |  | NA | Yes | NA | Yes | NA | Yes |
| 5 | Yes | Yes | Yes | Yes | Yes | Yes | Yes | Yes |
| 6 | Yes | Yes | Yes | Yes | Yes | Yes | Yes | Yes |
| 7 | Yes | Yes | Yes | Yes | Yes | Yes | Yes | Yes |
| 8 | Yes | Yes | Yes | Yes | Yes | Yes | Yes | Yes |

|  | Underover Sizing | Path Implode | Difference Measurement | Measurement Implode |
|---|---|---|---|---|
| Number of steps | 3 | 4 |  | 4 |
| Number of parameters | 1 | 2 | 2 | 2 |
| Found all issues |  | Yes | Yes | Yes |
| False Positives | No | No | No | No |
| False Negatives |  | Yes | No | No |

VERIFICATION OF FRACTURED MASK DATA

CROSS-REFERENCE TO RELATED APPLICATION

This application claims priority to U.S. provisional patent application No. 61/804,861, filed Mar. 25, 2013, which is incorporated herein in its entirety by reference.

TECHNICAL FIELD

This disclosure relates in general to the fabrication of semiconductor chips and more specifically to the verification of fractured mask data used in the layout of an integrated circuit (IC) for printing on a semiconductor chip.

BACKGROUND

A common mask writer used in the art is known as a variable shape beam (VSB) mask writer. Such VSB mask writers require mask data with all angle edges approximated by staircases (stacked slits) in either a horizontal or vertical direction. That is, the original data representing a desired layout design is fractured into mask data in a VSB format that approximates the original data. The approximation uses 0, 45 or 90 degree edges, depending on the fracture setup and the angle of the edges in the original data. Skew error represents the differences between the fractured data in the VSB format output and the original data before fracturing.

BRIEF SUMMARY

Disclosed embodiments describe ways to verify fractured mask data in variable shape beam format. An apparatus described herein that can perform such a verification includes a memory and a processor. The processor is configured to execute instructions stored in the memory to receive fractured mask data and unfractured design data from which the fractured mask data was generated using a fracture algorithm, the fractured mask data in variable shape beam format, receive at least one control parameter related to the fractured mask data, the at least one control parameter including a maximum skew error, and perform a filter algorithm with the at least one control parameter as an input that identifies at least one error in the fractured mask data as compared to the unfractured design data other than approximation differences resulting from the fracture algorithm, the at least one error including an edge shift in the fractured mask data as compared to the unfractured design data that is smaller than the maximum skew value.

Also described herein is a non-transitory computer-readable storage medium storing instructions that, when executed by a processor, perform the steps of receiving fractured mask data and unfractured design data from which the fractured mask data was generated using a fracture algorithm, the fractured mask data in variable shape beam format, receiving at least one control parameter related to the fractured mask data, the at least one control parameter including a maximum skew error, and performing a filter algorithm with the at least one control parameter as an input that identifies at least one error in the fractured mask data as compared to the unfractured design data other than approximation differences resulting from the fracture algorithm, the at least one error including an edge shift in the fractured mask data as compared to the unfractured design data that is smaller than the maximum skew value.

One method for verification described herein includes receiving fractured mask data and unfractured design data from which the fractured mask data was generated using a fracture algorithm, the fractured mask data in variable shape beam format, receiving at least one control parameter related to the fractured mask data, the at least one control parameter including a maximum skew error, and performing a filter algorithm with the at least one control parameter as an input that identifies at least one error in the fractured mask data as compared to the unfractured design data other than approximation differences resulting from the fracture algorithm, the at least one error including an edge shift in the fractured mask data as compared to the unfractured design data that is smaller than the maximum skew value.

Variations in these embodiments and other embodiments are described hereinafter.

BRIEF DESCRIPTION OF THE DRAWINGS

The description herein makes reference to the accompanying drawings wherein like reference numerals refer to like parts throughout the several views, and wherein:

FIGS. 9A-9D are a series of diagrams representing the steps for a path implode compare function according to the teachings herein wherein

FIGS. 10A-10D are a series of diagrams representing the steps for a difference measurement compare function according to the teachings herein wherein

FIGS. 11A-11D are a series of diagrams representing the steps for a measurement implode compare function according to the teachings herein wherein

FIGS. 12A-12D are a series of diagrams representing the steps for an underover sizing compare function for comparison with the functions of FIGS. 9A-9D, 10A-10D and 11A-11D wherein

FIGS. 18A-18D are a series of diagrams representing the steps for a path slice compare function according to the teachings herein wherein

DETAILED DESCRIPTION

As explained briefly above, mask data is derived from design data that can have geometry with edges at all angles. VSB mask writers require that mask geometries have edges at specific angles, because the writing process employs specific shapes (e.g., rectangles and trapezoids). Therefore, before mask data can be passed to a mask writer, it must first be approximated using the shapes. This approximation method is also known as VSB fracture. Depending on the mask writing machine to be used, the fracture method (also called the fracture algorithm herein) uses only Manhattan-style output, i.e., output geometry that has edges at only 0° or 90°, or uses Manhattan-style output with the addition of 45° edges. Skew error, as a measure of the differences between fractured data in the VSB format and the original data, is an indication of the effectiveness of the algorithm used to fracture the original design to the VSB format.

Because the design data is approximated by the VSB fracture, approximation differences frequently result. These approximation differences are often large in number. For this reason, fundamental problems may be obscured or hidden among all of the output due to the approximation differences, making verification of the fractured output using skew error difficult. The teachings herein describe comparison techniques that are able to separate the contributions to skew error due to the normal approximations of the fracture algorithm from those that represent other issues during the process caused by failures of the fracture algorithm in approximating one or more data locations. In this way, windows with approximation issues can be detected and corrected where appropriate, thereby improving the mask data preparation (MDP)-to-lithography process.

Figure 1:
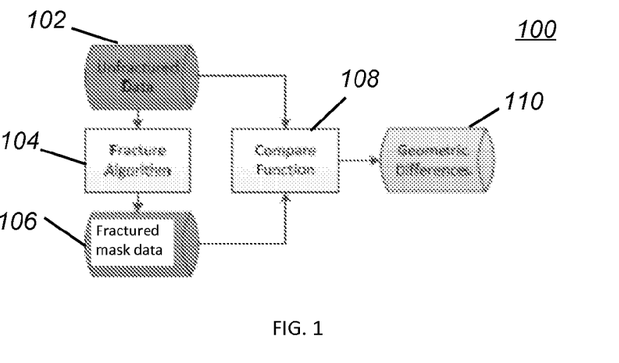
FIG. 1 is a block diagram illustrating the data flow for data verification of fractured data as compared to unfractured original data.
Figures 2, 3A, 3B:
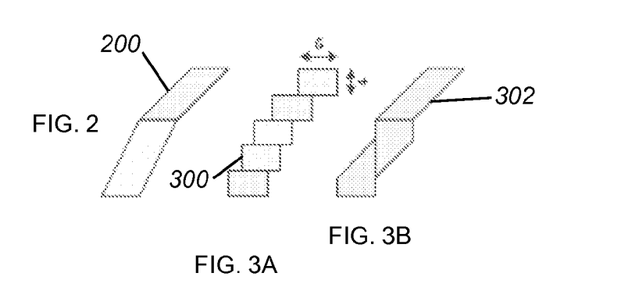
FIG. 2 is a diagram of a sample of unfractured data.
FIG. 3A is a diagram of the mask data resulting from applying a fracture algorithm to the sample of FIG. 2.
FIG. 3B is a diagram of the mask data resulting from applying an alternative fracture algorithm to the sample of FIG. 2.

FIG. 1 is a block diagram illustrating the data flow 100 for data verification of fractured data as compared to unfractured original data. In this verification data flow, unfractured data 102 is processed through a fracture algorithm 104 to produce fractured mask data 106 according to known techniques. FIG. 2 is a diagram of a sample of unfractured data 200, i.e., an original data sample illustrating a desired polygon of a mask design. FIG. 3A is a diagram of the fractured mask data 300 resulting from applying a fracture algorithm to the data 200 of FIG. 2, while FIG. 3B is a diagram of the fractured mask data 302 resulting from applying an alternative fracture algorithm to the data 200 of FIG. 2. The fracture algorithm used to generate the mask data 300 of FIG. 3A has a Manhattan-style output with edges only at 0° and 90°. The fracture algorithm used to generate the mask data 302 of FIG. 3B has a Manhattan-style output with the additional of edges at 45°. The fractured data 300, 302 represents coordinates for features to be generated for writing to a mask. FIG. 3A illustrates a so-called "staircase" formed using blocks having a length of 6 units of measure and a height is 4 units of measure. This output represents data in a conventional VSB12 format by example. The units of measurement can vary based on the application.

Referring again to FIG. 1, the original, unfractured data 102 and the fractured mask data 106 are provided to a compare function 108 to extract geometric differences 110 between the data 102, 106. In the fracture verification flow, the compare function 108 may be employed in logical parallel with the data fracture algorithm 104. Ideally, the output of the compare function 108 is empty for correct comparisons (no false positives), and only for correct comparison (no false negatives). That is, there are no geometric differences 110 indicated due to false positives or false negatives and geometric differences 110 only include actual differences between the two sets of data 102, 106.

Figures 4A, 4B:
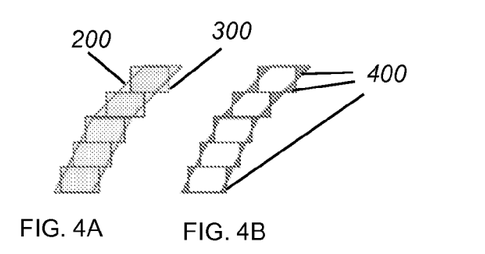
FIGS. 4A and 4B are diagrams of a compare function and its output, respectively, using the unfractured data of FIG. 2 and the fractured mask data of FIG. 3A.
Figures 5A, 5B:
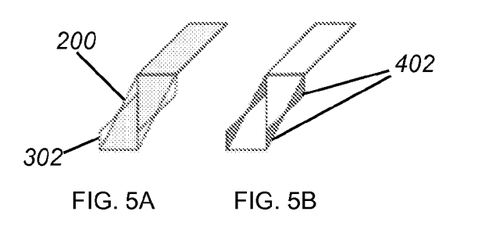
FIGS. 5A and 5B are diagrams of a compare function and its output, respectively, using the unfractured data of FIG. 2 and the fractured mask data of FIG. 3B.

One compare function 108 is a direct geometrical comparison, also known as a logical or Boolean XOR operation. In simple terms, the output of the function is the geometry that is one input but not the other. FIGS. 4A and 4B are diagrams of a compare function and its output using the unfractured data 200 of FIG. 2 and the fractured mask data 300 of FIG. 3A, and FIGS. 5A and 5B are diagrams of a compare function and its output using the unfractured data 200 of FIG. 2 and the fractured mask data 302 of FIG. 3B. FIG. 4A is a geometrical comparison between the unfractured data 200 and the fractured data 300, while the highlighted portions of FIG. 4B represent the compare output 400 of the compare function, in this case a Boolean XOR operation. In a like manner, FIG. 5A shows a geometrical comparison between the unfractured data 200 and the fractured data 302, while the highlighted portions of FIG. 5B represent the compare output 402 of a Boolean XOR operation. As can be seen from these figures, the output 400, 402 represents the approximation difference (e.g., geometric differences 110), where each polygon of the output 400, 402 is a deviation from the unfractured data 200.

Figure 6:
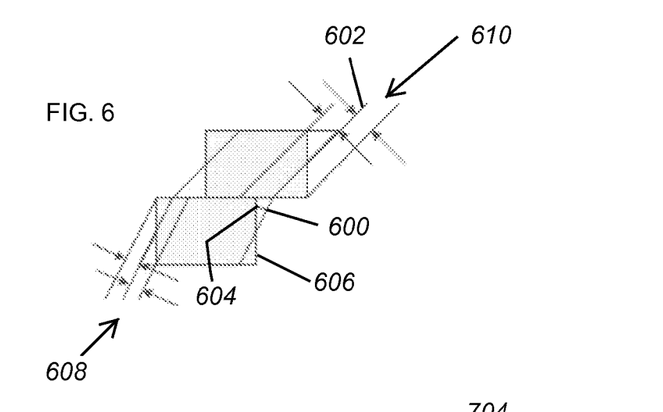
FIG. 6 is a diagram illustrating the error nomenclature used to describe the implementations herein.

Referring now to FIG. 6, a diagram illustrating the error nomenclature used to describe the implementations herein is described. FIG. 6 is a portion of the comparison of FIG. 4A. The distance between a point 600 on an edge 602 of the unfractured data 200 and its corresponding point 604 on an edge of the fractured data 606 (i.e., a point perpendicular to the edge 602) is the skew error. The distance that crosses a vertex on the fractured data is the biggest approximation for that particular difference polygon (highlighted area in FIG. 4A), and is known as slit skew 608. The biggest slit skew in the entire design is known as maximum skew error 610. An edge of unfractured data may also be called an unfractured edge herein. Similarly, an edge of fractured data may also be called a fractured edge herein.

A problem with conventional compare functions including a logical or Boolean XOR operation is that the fracture process always produces output that has skew error for design data that is not purely Manhattan (or Manhattan with the addition of 45° edges). The output of an XOR operation between the fractured and unfractured data is not only non-empty in such cases, but it can be overwhelming due to the number of differences. Most of the XOR output (i.e., the geometrical differences 110) is due to the "staircasing" of the fracture process, and such differences are expected and thus uninteresting. However, if the fracture process was ineffective, or if the fractured data contains data integrity issues (such as shifted edges or added/dropped figures), then the differences produced as a result are considered interesting, and need to be analyzed.

Figures 7A, 7B, 7C, 7D:
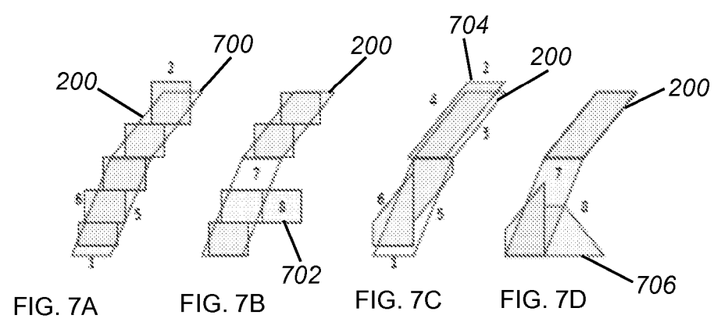
FIGS. 7A and 7B are diagrams illustrating two different outputs of a fracture algorithm applied to the unfractured data of FIG. 2 with errors introduced into the fractured data.
FIGS. 7C and 7D are diagrams illustrating two different outputs of an alternative fracture algorithm applied to the unfractured data of FIG. 2 with errors introduced into the fractured data.

The techniques of separating interesting differences from the uninteresting ones are illustrated in FIGS. 7A-7D using the sample design geometry 200 of FIG. 2 and the fracture algorithms that would, absent errors, result in the VSB format output 300, 302 represented by FIGS. 3A and 3B. More specifically, FIGS. 7A and 7B are diagrams illustrating two different outputs 700, 702 of a fracture algorithm applied to the unfractured data 200 of FIG. 2 with errors introduced into the fractured data, and FIGS. 7C and 7D are diagrams illustrating two different outputs 704, 706 of an alternative fracture algorithm applied to the unfractured data 200 of FIG. 2 with errors introduced into the fractured data. The fracture algorithm used in FIGS. 7A and 7B has a Manhattan-style output with edges only at 0° and 90°, similar to FIG. 3A. The alternative fracture algorithm used in FIGS. 7C and 7D has a Manhattan-style output with the addition of 45° edges, similar to FIG. 3B.

FIGS. 7A-7D illustrate variations in output that introduce errors that correspond to the following situations:
  1. Move a Manhattan edge in (up);
  2. Move a Manhattan edge out (up);
  3. Move a 45° edge in (shift vertices left);
  4. Move a 45° edge out (shift vertices left);
  5. Increase skew error by moving a staircase vertex in (shift edge left);
  6. Increase skew error by moving a staircase vertex out (shift edge left);
  7. Drop a figure; and
  8. Add a figure.

In these examples, the notation "1" in the comparison of the design data 200 and its resulting mask data 700, 704 in FIGS. 7A and 7C, respectively, illustrate situation 1 above, the notation "2" in the comparison of the design data 200 and its resulting mask data 700, 704 in FIGS. 7A and 7C, respectively, illustrate situation 2 above, and so on. The Manhattan and 45° edge shifts (i.e., situations 1-4 above) are small compared to the fracture figures (slits) so as to test the sensitivity of the compare functions described herein. Note that certain situations may be relevant to one fracture algorithm but not others. For example, situations 3 and 4 above are not relevant to Manhattan data that does not allow 45° angles. For clarity, and to further demonstrate the errors, the unfractured data 200 is shown superposed with the fractured data 700, 702, 704, 706 in FIGS. 7A-7D.

Figure 8:
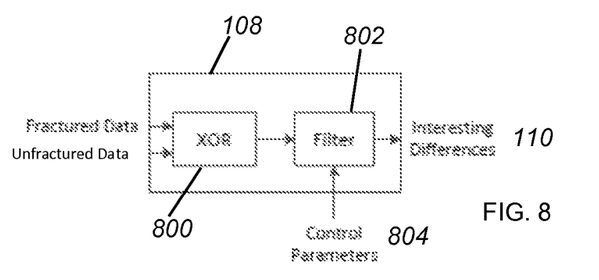
FIG. 8 is a block diagram illustrating the general architecture for the compare functions described herein.
Figure 9A:
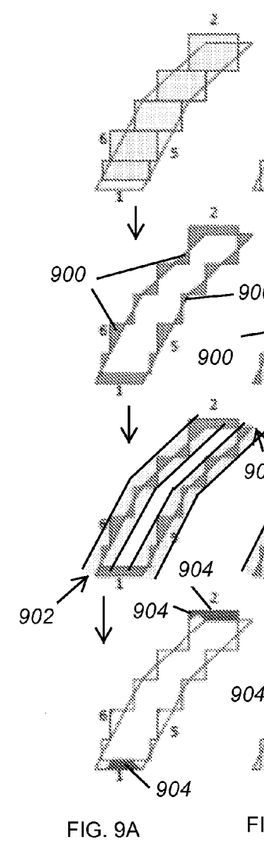
FIG. 9A is a series of four diagrams illustrating performance of the steps of the path implode compare function using the data of FIG. 7A as input.
Figures 9B, 9C, 9D:
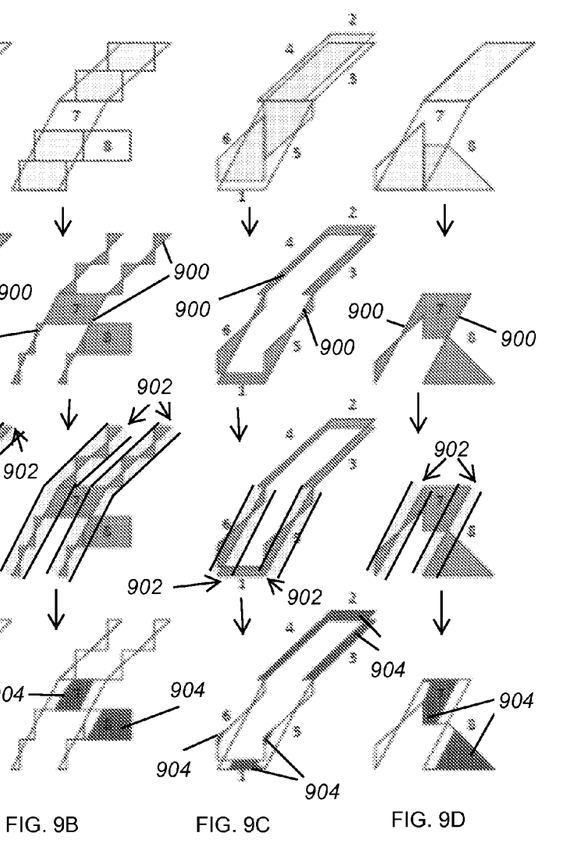
FIG. 9B is a series of four diagrams illustrating performance of the steps of the path implode compare function using the data of FIG. 7B as input.
FIG. 9C is a series of four diagrams illustrating performance of the steps of the path implode compare function using the data of FIG. 7C as input.
FIG. 9D is a series of four diagrams illustrating performance of the steps of the path implode compare function using the data of FIG. 7D as input.
Figures 10A, 10B, 10C, 10D:
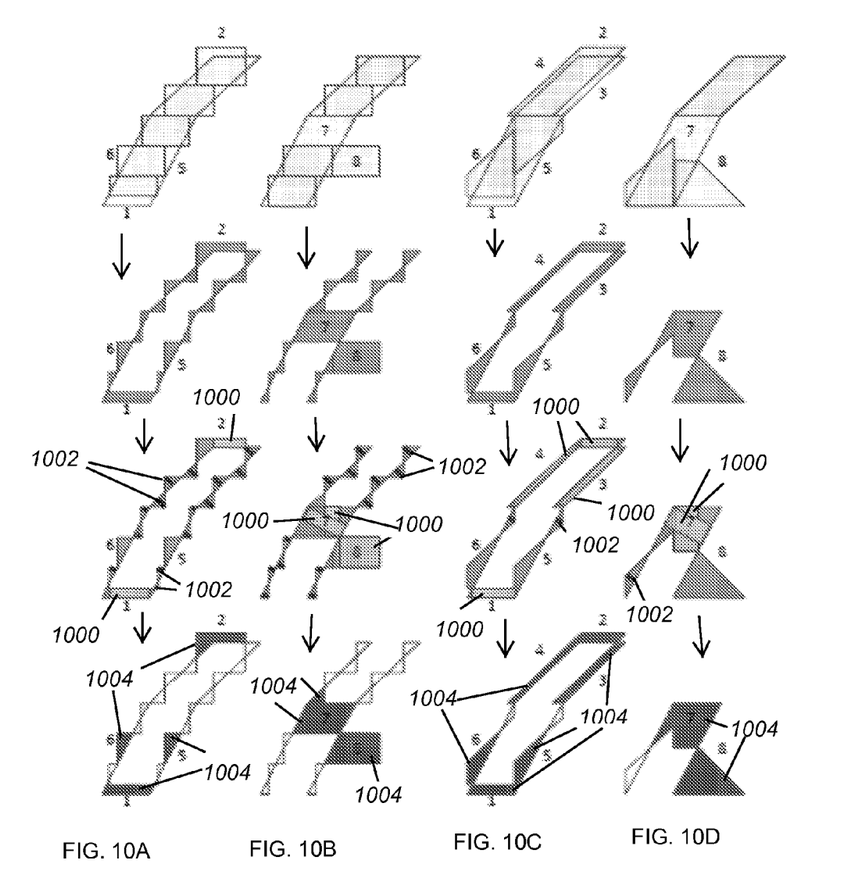
FIG. 10A is a series of four diagrams illustrating performance of the steps of the difference measurement compare function using the data of FIG. 7A as input.
FIG. 10B is a series of four diagrams illustrating performance of the steps of the difference measurement compare function using the data of FIG. 7B as input.
FIG. 10C is a series of four diagrams illustrating performance of the steps of the difference measurement compare function using the data of FIG. 7C as input.
FIG. 10D is a series of four diagrams illustrating performance of the steps of the difference measurement compare function using the data of FIG. 7D as input.
Figures 11A, 11B, 11C, 11D:
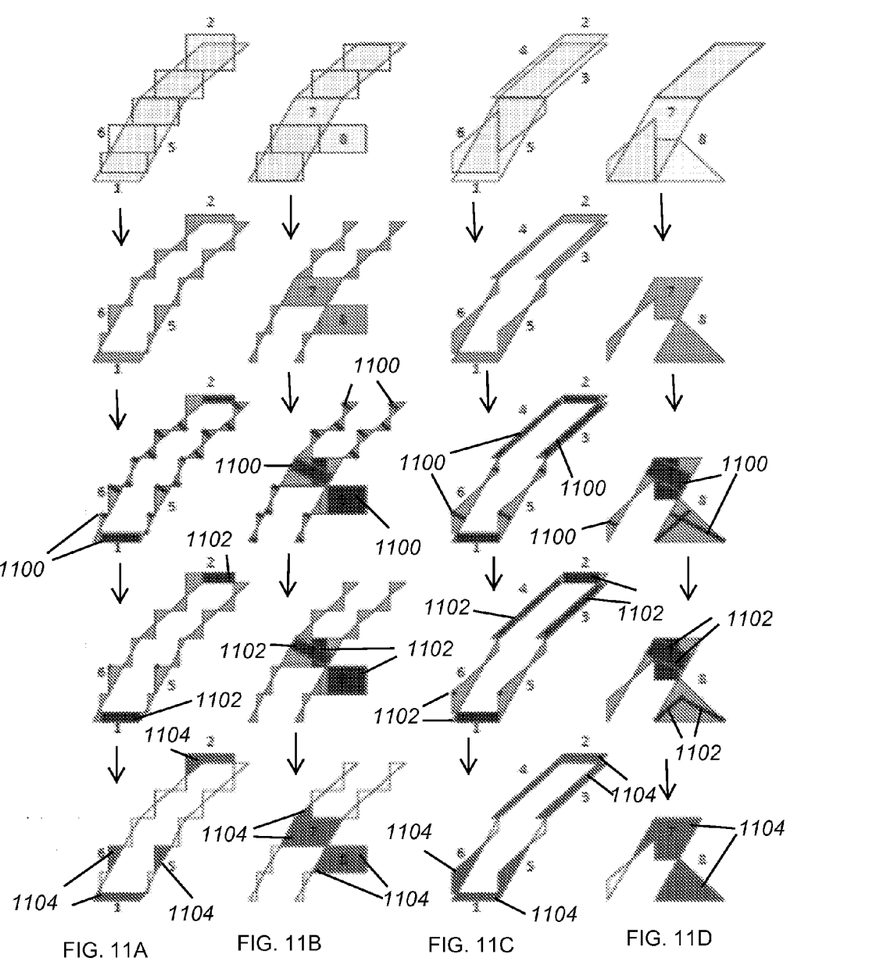
FIG. 11A is a series of five diagrams illustrating performance of the steps of the measurement implode compare function using the data of FIG. 7A as input.
FIG. 11B is a series of five diagrams illustrating performance of the steps of the measurement implode compare function using the data of FIG. 7B as input.
FIG. 11C is a series of five diagrams illustrating performance of the steps of the measurement implode compare function using the data of FIG. 7C as input.
FIG. 11D is a series of five diagrams illustrating performance of the steps of the measurement implode compare function using the data of FIG. 7D as input.

FIG. 8 is a block diagram illustrating the general architecture for the compare algorithm or function 108 described herein, which is a more detailed representation of the compare function 108 in FIG. 1. According to one implementation of the teachings herein, the compare function 108 starts with a direct geometrical comparison 800, i.e., an XOR operation described above, between the fractured and unfractured data sets 102, 106. The result is then processed further through a filter 802 using one of a variety of methods to filter out the uninteresting differences based on input control parameters 804 so that the only geometric differences 110 kept may be characterized as interesting differences 110. FIGS. 7A-7D illustrate certain of these interesting differences, which are those:
  with a slit skew greater than the maximum skew error;
  that are due to shifts in 0°, 45°, or 90° edges in the fractured data; or
  that are due to extra or dropped figures.

More generally, different implementations of the compare function 108 described herein accurately identify errors introduced into fractured mask data that are not expected errors based on the fracture algorithm used to generate the fractured mask data. The fracture process and its results are different depending on whether the output is intended for a mask machine that allows only Manhattan data (0° and 90° edges), or one that allows Manhattan and 45° edges. Accordingly, in some cases, the type of fracture process or algorithm 104 used is one of the control parameters 804 used for the filter portion 802 of the compare function 108.

This control parameter 804 and others are described with reference to FIGS. 9A-12D. In brief, FIGS. 9A-9D describe a compare function including an XOR operation followed by a cut out of differences starting from unfractured polygon edges, FIGS. 10A-10D describe a compare function including an XOR operation followed by measurement of differences in the direction orthogonal to the unfractured edges, and FIGS. 11A-11D describe a compare function that is a mix of those described with respect to FIGS. 9A-9D and 10A-10D and includes an XOR operation followed by measurement of differences in the direction orthogonal to the unfractured edges, which is then followed by a cut out of the measurement results. FIGS. 12A-12D describe an existing compare function including an XOR operation followed by a double geometric biasing.

A general discussion of the geometric principles involved in the filter component is helpful. In reference to data geometry, a path is a series of connected polygon edges, i.e., a partial polygon boundary. Because VSB fracture algorithms approximate the edges by staircases, vertices of a fractured polygon may be contained within an envelope around the unfractured path that can be used to distinguish interesting differences (i.e., differences that reflect errors in the fracturing process) from uninteresting differences (i.e., expected differences due to the fracturing process itself). The size of that envelope, or the maximum distance that those vertices can be away from the unfractured edge, may be the maximum skew error as described above or some other variable related to the geometry. In this analysis, special allowance is made for those edges that match the fracture process orientation. Namely, for Manhattan fractures that do not allow 45° angles, the edges that result from unfractured edges at 0° and 90° must remain collinear. For non-Manhattan fractures (i.e., those that allow 45° degree edges), those edges at 45° must also remain collinear.

As mentioned, the envelope may be used to distinguish interesting from uninteresting differences in the filter component. Certain techniques for generating an envelope are described hereinafter using as input difference data comparing the fractured data to the unfractured data. In another technique, an (e.g., low-level) algorithm may construct an envelope directly from one or more selected paths along the difference data. The resulting envelopes may have slightly different shapes from those described below with reference to FIGS. 7-10.

FIGS. 9A-9D are a series of diagrams representing the steps for a first implementation of the compare function 108 according to the teachings herein. This compare function 108 is referred to as a path implode compare function. The compare function 108 is described by using the fractured and unfractured data illustrated in FIGS. 7A-7D as inputs, shown at the top of FIGS. 9A-9D, respectively, and referred to as compare input herein. The first step in this process is to generate the difference data between the fractured and unfractured compare input. In this example, the XOR operation 800 is performed to generate respective XOR output, which is shown in the subsequent sets of diagrams in FIGS. 9A-9D. Next, filter component 802 of compare function 108 is performed using the XOR output as input data.

The filter component 802 of this comparison technique first selects all those paths 900 in the XOR output composed of non-special edges (known as all-angle edges), and explodes them by the maximum skew error value both toward the inside and outside of the geometry. That is, the points forming these paths 900 are expanded to reach the value of the maximum skew error. This process is called path select, and the resulting exploded paths for each example XOR output are shown as respective envelopes 902 within which the approximation differences are contained.

Next, the resulting exploded path generated using each XOR output is subtracted from the XOR output. That is, portions of polygons (including whole polygons) within the XOR output that are within the envelopes 902 are removed (subtracted) by filter component 802. Everything subtracted is considered to be an uninteresting difference between the fractured data 102 and unfractured data 106. Any differences remaining are therefore interesting and may be output for further consideration to correct the errors or to otherwise handle the data in the MDP-to-lithography process flow. This process is called path implode and the output error data 904 for each example is shown in the diagrams at the bottom of each of FIGS. 9A-9D. This output error data 904 represents the interesting differences 110 in FIG. 8.

Because the fracture algorithm 104 makes a difference, the fracture algorithm 104 that is used to fracture the data is a control parameter 804, as is the maximum skew error of the resulting fractured data. The fracture algorithm 104 may be represented by an ALLOW45 value that indicates whether the fracture algorithm 104 allows 45° edges or not. The maximum skew error is generally provided as an output of the fracture algorithm 104, but it can be separately measured or calculated if needed or desired.

FIGS. 10A-10D are a series of diagrams representing the steps for a second implementation of the compare function 108 according to the teachings herein. This compare function 108 is referred to as a difference measurement compare function. The compare function 108 is described by using the fractured and unfractured data illustrated in FIGS. 7A-7D as inputs. This compare output is shown at the top of FIGS. 10A-10D, respectively. Similar to the compare function in FIGS. 9A-9D, the first step in this process is to generate the difference data between the fractured and unfractured input data. In this example, the XOR operation 800 is performed to generate respective XOR output, which is shown in the subsequent sets of diagrams in FIGS. 10A-10D. Next, filter component 802 of the compare function 108 is performed using the XOR output as input data.

The first step of the filter component 106 of FIGS. 10A-10D is direct measurement of the differences represented by the XOR output. Two such measurements are performed using the XOR output in order to distinguish special edges (that is, edges associated with shapes other than those expected due to the fracture algorithm 104 alone) and edges that occur due solely to errors introduced by the fracture algorithm 104 used in generating the fractured data (that is, edges of polygons in the XOR output that would exist even in the absence of any errors in implementing the fracture algorithm 104): 1) an internal edge to edge spacing check and 2) an internal edge to concave corner check. The values used for these spacing calculations may be, for example, coordinate values along defined X- and Y-axes of the fractured data design or any other coordinate system that could be used to measure the differences.

Ideally, the fractured and unfractured edges should be collinear—that is, there is no space between them. However, using 0 for the spacing check would result in an open-ended infinite range. A maximum value for a spacing check cap is thus included as a control parameter 804. The maximum value is discussed in more detail with the description of FIGS. 11A-11D.

Any differences 1000 identified by the internal edge to edge spacing check result from the presence of a special edge. Those differences 1000 for each example XOR output are highlighted in the output shown next in FIGS. 10A-10D. The polygons associated with these differences 1000 contain the special edge and may be immediately identified as interesting differences 110. They are not considered in the second measurement of the XOR output.

The second measurement is an internal edge to concave corner check (also called the concave to edge check) that is intended to remove those remaining differences that are not interesting. If the internal edge to concave corner measurement is less than the maximum skew error discussed previously, the associated polygons are not considered interesting. Those edge to corner measurements 1002 that satisfy this requirement are shown in the same output diagrams as the internal spacing and corner measure. All such measurements 1002 are not labeled for clarity. Their associated polygons of the XOR output are filtered. The remaining difference polygons of the XOR output, including the polygons identified using the first measurement, are considered interesting. They constitute output error data 1004 of the filter component 802 of the compare function 108 shown in the interact output at the bottom of FIGS. 10A-10D. The output error data 1004 represents the interesting differences 110 in FIG. 8.

FIGS. 11A-11D are a series of diagrams representing the steps for a third implementation of the compare function 108 according to the teachings herein. This compare function 108 is referred to as measurement implode compare function. The compare function 108 is described by using the fractured and unfractured data illustrated in FIGS. 7A-7D as inputs, shown as the compare output at the top of FIGS. 11A-11D. Similar to the compare function in FIGS. 9A-9D and 10A-10D, the first step in this process is to generate the difference data between the fractured and unfractured input data. In this example, the XOR operation 800 is performed to generate respective XOR output, which is shown in the next row of diagrams in FIGS. 11A-11D. Next, the filter component 802 of the compare function 108 is performed.

The measurement implode compare function mixes the concepts of the difference measurement compare function and the path implode compare function to result in a less complex filter component 106 than that in the difference measurement compare function. Namely, following the calculations of the edge to edge and edge to concave corner of the difference measurement step for the XOR output, which results in the measurements 1100 in an output in each of FIGS. 11A-11D that is the same as that shown respectively in FIGS. 10A-10D, a direct internal spacing and corner measurement is performed in a single measurement implode step. All measurements 1100 are not labeled for clarity.

In the single measurement implode step producing measurements 1100, both the edge to edge and edge to concave corner spacing checks are compared with an open ended range (i.e., greater than 0 with a spacing check cap as discussed above as a control parameter 804). When the spacing of measurements 1100 is outside the range, a measurement identifies an interesting feature 110.

The spacing check cap may be selected to optimize performance of the filter component 802. According to one implementation, the user can set the value manually. According to another implementation, the cap may be set automatically by relating it to the maximum skew error by a multiplier. This reduces the number of control parameters 804 for each of the difference measurement step and the measurement implode step. Testing of this measurement implode step, the results of which are described in additional detail below, determined that a high cap value resulted in a drop in performance because of the large amount of data being processed. Too low a value for the cap resulted in a large number of false negatives (that is, too many interesting areas were omitted from the test results). One value for the spacing check cap that worked well with the test inputs here was a multiplier of 5 to the maximum skew error of each test pair (i.e., each pair of fractured and unfractured data as shown in FIGS. 7A-7D). The test results described hereinafter use respective spacing check cap values calculated using the multiplier of 5 to the respective maximum skew errors.

The measurement output 1102 of this step, also referred to as a measure implode step, are shown as the next diagrams in FIGS. 11A-11D. These are next processed by a path shortening step that acts only on open paths, which means only the corner check vectors are affected. The path shortening step shortens these vectors by the maximum skew error. This idea is similar to the concept used in the path implode compare function, where all edge to concave corner vectors shorter than the maximum skew error are considered uninteresting. All polygons that contain these remaining results are output 904 as interesting differences 110. This output 904 may be referred to as interact output.

FIGS. 12A-12D are a series of diagrams representing the steps for an underover sizing compare function for comparison with the functions of FIGS. 9A-9D, 10A-10D and 11A-11D. The technique described in FIG. 12A-12D is in use. In this example, the technique is illustrated using the fractured and unfractured data of FIGS. 7A-7D as compare inputs at the top of each of FIGS. 12A-12D. Similar to the compare functions in FIGS. 9A-9D, 10A-10D and 11A-11D, the first step in this process is to generate the difference data between the fractured and unfractured input data. In this example, an XOR operation is performed to generate XOR output as nexr shown in FIGS. 12A-12D. Next, filter component 802 of compare function 108 is performed using the XOR output as input data.

Sizing, used in the filter component 802, is also known as geometric biasing, which in this case means the wavefront principle. In simple terms, polygon edges are moved parallel to their original orientation by a sizing amount, and vertices are moved along their angle bisector. When two vertices join due to a convergent sizing path, the edge between them is removed, and when a vertex cuts a line, the vertex is duplicated. In both cases, the polygon undergoes topological changes. Undersizing, or negative biasing, refers to biasing towards the inside of the geometry, while oversizing, or positive biasing, refers to biasing towards the outside of the geometry. An underover sizing operation means that two successive sizing steps are performed: a negative sizing step followed by a positive sizing step. Because the geometry undergoes topological changes, any polygons of the XOR output that have null area after the negative sizing step are discarded, and therefore will not show up after the positive sizing step. In this way, the underover sizing operation acts as a filter against polygons that are thinner than the sizing amount, which is why in this technique it is used as the filter component of the architecture. The underover sizing output 1200 of the filter component, which indicates the interesting areas 110 found by performing the underover sizing operation of the XOR output, is shown at the bottom of each of FIGS. 12A-12D.

The control parameter in this compare function is the sizing amount of the sizing steps. In this example, the value of the sizing amount is half the maximum skew error.

Figures 12A, 12B, 12C, 12D, 13:
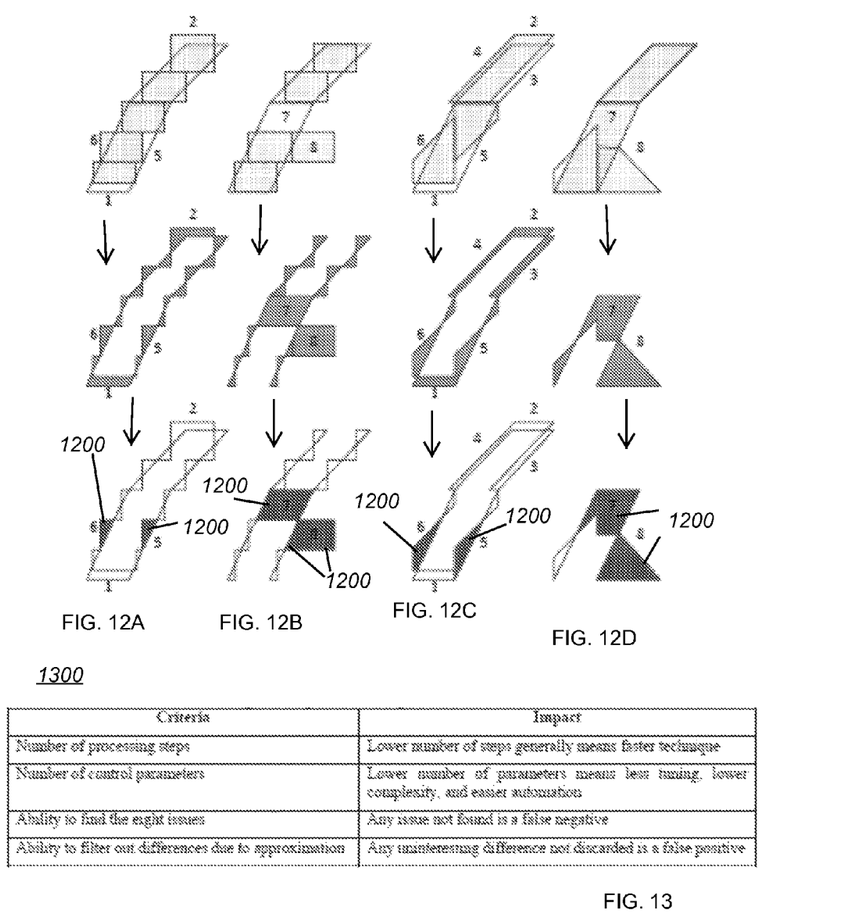
FIG. 12A is a series of three diagrams illustrating performance of the steps of the underover sizing compare function using the data of FIG. 7A as input.
FIG. 12B is a series of three diagrams illustrating performance of the steps of the underover sizing compare function using the data of FIG. 7B as input.
FIG. 12C is a series of three diagrams illustrating performance of the steps of the path underover sizing function using the data of FIG. 7C as input.
FIG. 12D is a series of three diagrams illustrating performance of the steps of the underover sizing compare function using the data of FIG. 7D as input.
FIG. 13 is a table illustrating the criteria relevant for examining the compare functions illustrated in FIGS. 9A-9D, 10A-10D, 11A-11D and 12A-12D and the impacts expected by the criteria.

Each of the compare functions of FIGS. 9A-9D, 10A-10D, 11A-11D and 12A-12D was tested against certain criteria using the unfractured and fractured data of FIGS. 7A-7D. FIG. 13 is a table 1300 illustrating the criteria relevant for examining the compare functions illustrated in FIGS. 9A-9D, 10A-10D, 11A-11D and 12A-12D and the impacts expected by the criteria. The number of processing steps impacts the process in that a lower number of steps generally means a faster verification. The number of control parameters impacts the process in that a lower number of parameters means less tuning, less complexity and easier automation. The ability to find the eight situations or issues of FIGS. 7A-7D impacts the process in that any issue not found is a false negative. Finally, the ability to filter out differences due to approximation impacts the process in that any uninteresting difference not discarded is a false positive.

Figure 14:
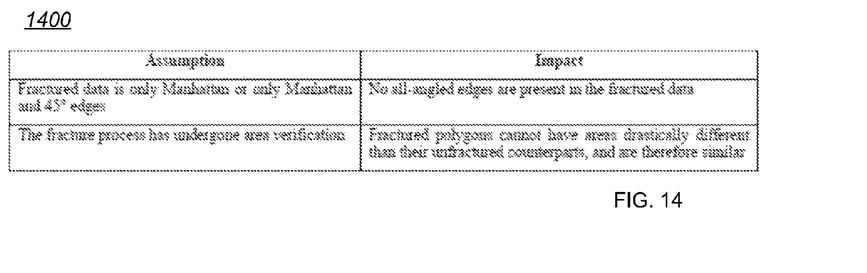
FIG. 14 is a table illustrating the assumptions made in examining the compare functions illustrated in FIGS. 9A-9D, 10A-10D, 11A-11D and 12A-12D.

FIG. 14 is a table 1400 illustrating the assumptions made in examining the compare functions illustrated in FIGS. 9A-9D, 10A-10D, 11A-11D and 12A-12D. One assumption is whether the fractured data is only Manhattan or Manhattan with 45° edges as in the examples above. This means that there are no all-angled edges present in the fractured data. Another assumption is that the fracture process has undergone area verification. The means that the fractured polygons do not have areas drastically different from their unfractured counterparts.

Figure 15:
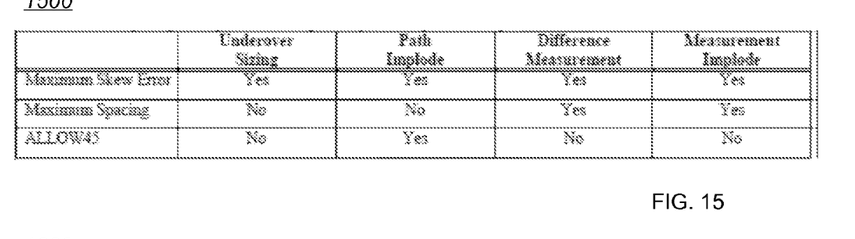
FIG. 15 is a table summarizing the specific parameters using in each of the compare functions illustrated in FIGS. 9A-9D, 10A-10D, 11A-11D and 12A-12D.
Figure 16:
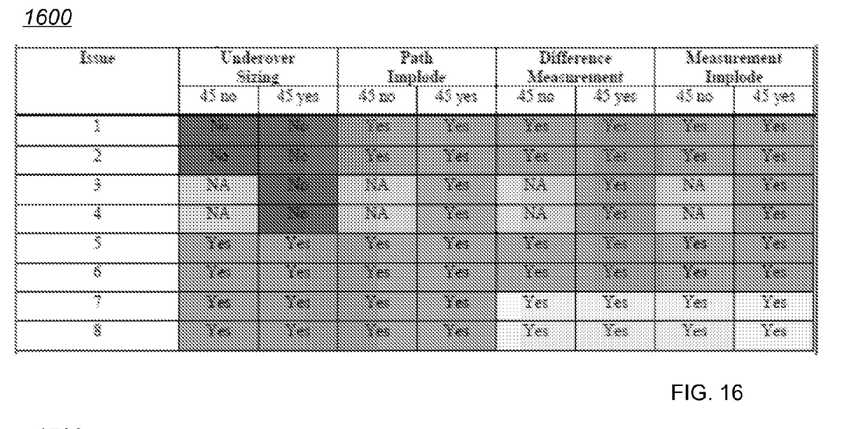
FIG. 16 is a table summarizing the effectiveness of the compare functions illustrated in FIGS. 9A-9D, 10A-10D, 11A-11D and 12A-12D relative to each of the eight issues represented in FIGS. 7A-7D.
Figure 17:
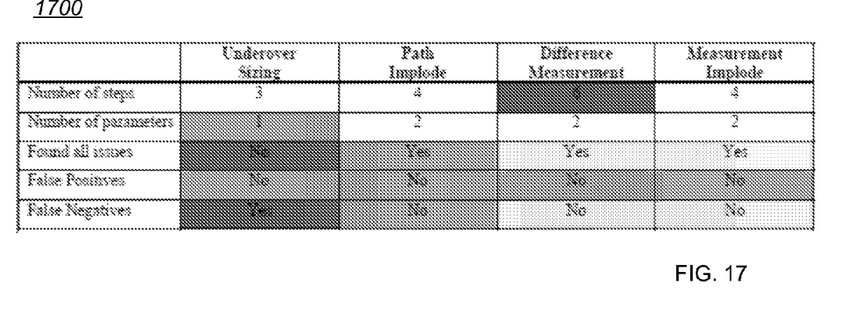
FIG. 17 is a table summarizing the behavior of the compare functions illustrated in FIGS. 9A-9D, 10A-10D, 11A-11D and 12A-12D relative to the criteria of FIG. 13.
Figures 18A, 18B, 18C, 18D:
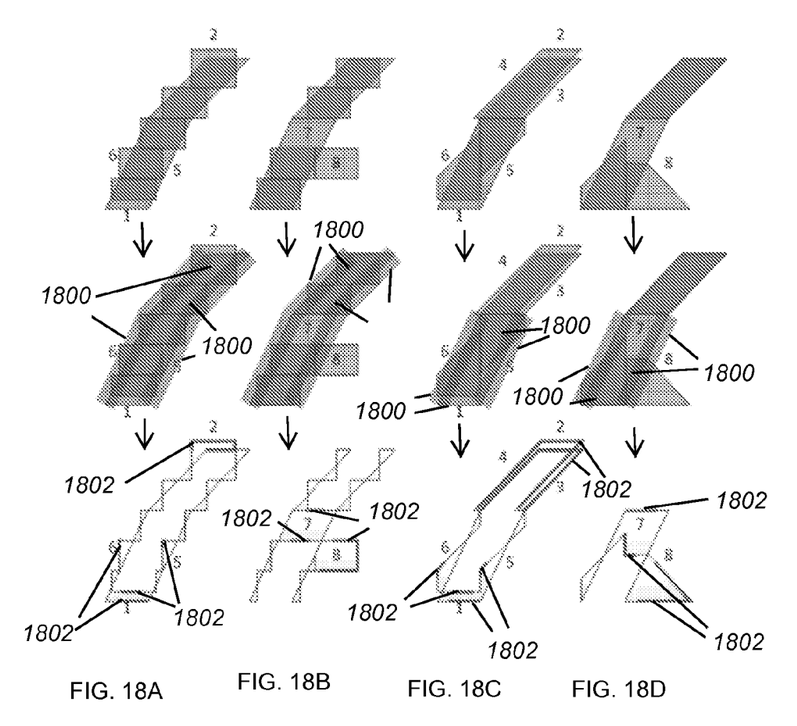
FIG. 18A is a series of three diagrams illustrating performance of the steps of the path slice compare function using the data of FIG. 7A as input.
FIG. 18B is a series of three diagrams illustrating performance of the steps of the path slice compare function using the data of FIG. 7B as input.
FIG. 18C is a series of three diagrams illustrating performance of the steps of the path slice sizing function using the data of FIG. 7C as input.
FIG. 18D is a series of three diagrams illustrating performance of the steps of the path slice compare function using the data of FIG. 7D as input.

In FIGS. 15-17, the column labeled "Underover Sizing" relates to FIGS. 12A-12D, the column labeled "Path Implode" relates to FIGS. 9A-9D, the column labeled "Difference Measurement" relates to FIGS. 10A-10D, and the column labeled "Measurement Implode" relates to FIGS. 11A-11D. FIG. 15 is a table 1500 summarizing the specific control parameters 804 used in each of the compare functions illustrated in FIGS. 9A-9D, 10A-10D, 11A-11D and 12A-12D. FIG. 16 is a table 1600 summarizing the effectiveness of the compare functions illustrated in FIGS. 9A-9D, 10A-10D, 11A-11D and 12A-12D relative to each of the eight situations or issues represented in FIGS. 7A-7D using the control parameters 804 of table 1500. FIG. 17 is a table 1700 summarizing the behavior of the compare functions illustrated in FIGS. 9A-9D, 10A-10D, 11A-11D and 12A-12D relative to the criteria of table 1300.

FIG. 15 includes the three control parameters 804 discussed previously. They include the maximum skew error, the maximum spacing (that is, the spacing check cap), and the value ALLOW45. Each of the path implode compare function of FIGS. 9A-9D, the difference measurement compare function of FIGS. 10A-10D, and the measurement implode compare function of FIGS. 11A-11D uses two of the three control parameters 804. The underover sizing compare function of FIGS. 12A-12D only uses the maximum skew area as a control parameter 804.

Each compare function 108 shown in FIG. 16 is tested using both a Manhattan-only fracture algorithm ("45 no") and a Manhattan fracture algorithm that allows 45° edges ("45 yes"). The results in FIG. 16 indicate whether the noted compare function 108 detects each of situations/issues 1 through 8 identified in FIGS. 7A-7D. The entry "NA" is used to represent that issues 3 and 4 are not applicable to a Manhattan-only fracture algorithm.

In the testing examples of FIG. 17, a processing "step" refers to a data processing command of the CATS® Manufacturing Rules Check and Correction (MRCC), available from Synopsys, Inc., of Mountain View, Calif. In other systems used to verify mask data, greater or fewer processing steps may be required to implement the teachings herein. The row "False Positives" indicates whether or not the output interesting differences 110 include any false positives, while the row "False Negatives" indicates whether or not the output interesting differences 110 include any false negatives.

As can be seen from the results of FIGS. 16 and 17, the underover sizing compare function of FIGS. 12A-12D is better than performing only a simple XOR comparison in identifying errors that are not expected based on the fracture algorithm. It is simple to use as it requires only a single control parameter, and the number of steps used to find the uninteresting differences is low, but it has several shortcomings. Most critically, it consistently misses edge shifts smaller than the maximum skew value. That is, the function misses straight Manhattan edges moved in or out from their expected locations vis-à-vis the original geometry by a relatively small amount and misses 45° edges shifted in or out from their expected locations vis-à-vis the original geometry by a relatively small amount. Accordingly, the underover sizing compare function has limited use.

The path implode compare function uses two control parameters as shown in FIG. 15, and is therefore considered to be slightly more difficult to automate than the underover sizing compare function. However, the maximum skew error is directly related to the fracture algorithm parameters, and the ALLOW45 parameter can also be obtained from the fracture process. This technique was found to be the best performing overall as shown in FIGS. 16 and 17, finding all issues and avoiding both false positives and false negatives.

Both the difference measurement compare function and the measurement implode compare function require an infinite range, which translates in practice to some maximum value to use as a cap. As explained above, it was found during testing as good practice to relate this cap to the maximum skew error by a multiplier, e.g., 5, therefore reducing the number of required control parameters from two to one, which simplifies tuning and automation. The difference measurement compare function performs well, but it has a higher number of processing steps, and is therefore expected to be slower.

The measurement implode compare function is very simple, and the last processing step may even be skipped if its interpretation is not a problem. However, it was found during testing that the detection of issues 7 and 8 is sensitive to the maximum cap parameter as well as the added/dropped geometry shape. Because this compare method uses concepts from the difference measurement compare function, it is conceivable that the difference measurement compare function is also sensitive to these factors.

There are also other compare functions that use direct polygon edge to edge cutting concepts rather than rely on geometrical difference processing (i.e., XOR), and yet they achieve similar results. FIGS. 18A-18D are a series of diagrams representing the steps for a path slice compare function according to the teachings herein. The compare function is described by using the fractured and unfractured data illustrated in FIGS. 7A-7D as inputs, repeated at the top of FIGS. 18A-18D. Unlike the compare functions in each of FIGS. 9A-9D, 10A-10D, 11A-11D and 12A-12D, there is no geometrical difference processing (e.g., no XOR operation 800) of the fractured and unfractured data before filtering. Instead, the filter component 802 is directly implemented by first selecting all those paths composed of non-special edges (known as all-angle edges). The all-angle edges 900 are shown by example in FIGS. 9A-9D. Then, the edges 900 are exploded by the maximum skew error, both toward the inside and outside of the geometry to form envelopes like envelopes 902 in FIGS. 9A-9D. That is, the concept of special edges is the same as described with respect to the path implode compare function above.

These exploded paths are shown as shaded areas in the images in the center of each of FIGS. 18A-18D and represent the envelopes within which the approximation differences would be contained. Any differences outside of the envelope are therefore considered of interest. The edge boundaries 1800 of these exploded paths are used to slice across the edge boundaries of the fractured and unfractured data, with the result that only those edges of one input, that are not in the other input, and that are also outside of the envelope, remain. These remaining edges 1802, represented by darkened lines in the output of each of FIGS. 18A-18D, are then exploded and output as interesting differences 110. Because the fracture process makes a difference, the ALLOW45 value used to fracture the VSB data is a control parameter input to the filter component 802, as is the maximum skew error.

Figure 19:
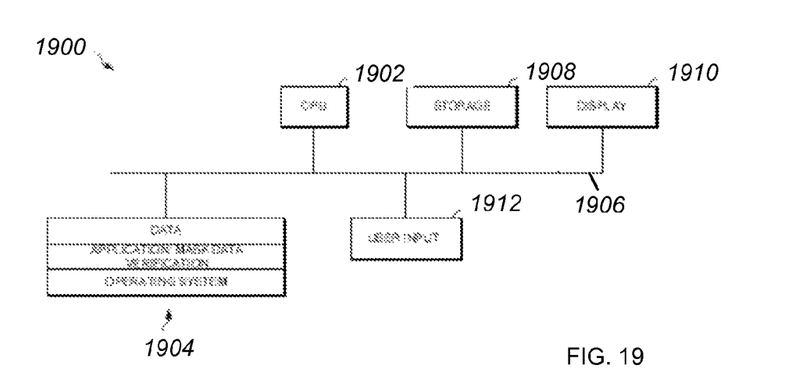
FIG. 19 is a diagram of a computing device in which the teachings herein may be incorporated.

FIG. 19 is a diagram of a computing device 1900 in which the teachings herein may be incorporated. Computing device 1900 can be in the form of a computing system including multiple computing devices, or in the form of a single computing device, for example, a mobile phone, a tablet computer, a laptop computer, a notebook computer, a desktop computer, and the like.

A CPU 1902 in computing device 1900 can be a conventional central processing unit. Alternatively, CPU 1902 can be any other type of device, or multiple devices, capable of manipulating or processing information now-existing or hereafter developed. Although the teachings herein can be practiced with a single processor as shown, e.g., CPU 1902, this is not required. More than one processor may be used. Unless otherwise noted herein, references to a processor may refer to one or more processors functioning together to perform the described processes or steps.

A memory 1904 in computing device 1900 may be a random access memory (RAM) device, but can be any other suitable type of storage device. Memory 1904 can include code and data that is accessed by CPU 1902 using a bus 1906. Memory 1904 can further include an operating system and one or more application programs. In this example, the application programs include at least one program that permits CPU 1902 to perform the mask data verification described here. Computing device 1900 can also include a secondary storage 1908, which can, for example, be a disk drive.

Computing device 1900 can also include one or more peripheral devices, such as a display 1910. Display 1910 may be, in one example, a touch sensitive display that combines a display with a touch sensitive element that is operable to sense touch inputs. Display 1910 can be coupled to CPU 1902 via bus 1906. When included, display 1910 can be implemented in various ways, including by a liquid crystal display (LCD), a cathode-ray tube (CRT) display or light emitting diode (LED) display, such as an OLED display. The touch sensitive element can be coupled to CPU 1902 via user input interface 1912 and bus 1906, for example. The user input interface 1912 can also be used to couple a keyboard, a mouse or any other means of acquiring input from a user for processing using CPU 1902.

Although FIG. 1 depicts CPU 1902 and memory 1904 of computing device 1900 as being integrated into a single unit, other configurations can be utilized. The operations of CPU 1902 can be distributed across multiple machines (each machine having one or more of processors) that can be coupled directly or across a local area or other network. Memory 1904 can be distributed across multiple machines such as a network-based memory or memory in multiple machines performing the operations of computing device 1900. Although depicted here as a single bus, bus 1906 of computing device 1900 can be composed of multiple buses. Further, secondary storage 1908 can be directly coupled to the other components of computing device 1900 or can be accessed via a network and can comprise a single integrated unit such as a memory card or multiple units such as multiple memory cards. Computing device 1900 can thus be implemented in a wide variety of configurations. Data received and used by computing device 1900 may be received by CPU 1902 internally from memory 1904 or storage 1908 or may be received externally from other, related processes through bus 1906.

Implementations of computing device 1900 (and the algorithms, methods, instructions, etc., stored thereon and/or executed thereby as described herein) may be realized in hardware, software, or any combination thereof. The hardware can include, for example, computers, IP cores, ASICs, PLAs, optical processors, PLCs, microcode, microcontrollers, servers, microprocessors, digital signal processors or any other suitable circuit. In the claims, the term "processor" should be understood as encompassing any of the foregoing hardware, either singly or in combination.

In one example, computing device 1900 may be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Further, some or all of the teachings herein may take the form of a computer program product accessible from, for example, a tangible (i.e., non-transitory) computer-usable or computer-readable medium. A computer-usable or computer-readable medium is any device that can, for example, tangibly contain, store, communicate, or transport the program for use by or in connection with any processor. The medium may be an electronic, magnetic, optical, electromagnetic or semiconductor device, for example.

The process is described generally herein as comparing the original, unfractured data to the fractured data based on the original, unfractured data. However, the teachings herein may compare unfractured data and fractured data wherein either or both sets of data are altered before the comparison for data correction, etc. Similarly, the unfractured data used for the comparison may not be the same data as used to generate the fractured data—instead it may be modified from that used to generate the fractured data or the data used to generate the fractured data may be modified from the unfractured data used for the comparison. Note that the mask data shown in the figures, both fractured and unfractured, are geometrical representations of mask data stored in a tangible, non-transitory medium (e.g., computer memory) for manipulation according to the teachings herein and may or may not also be included in other tangible formats, such as on paper.

As described herein, the processes include a series of steps. Unless otherwise indicated, the steps described may be processed in different orders, including in parallel. Moreover, steps other than those described may be included in certain implementations, or described steps may be omitted or combined, and not depart from the teachings herein.

While this disclosure includes certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
   memory; and
   a processor configured to execute instructions stored in the memory to:
   receive fractured mask data and unfractured design data from which the fractured mask data was generated using a fracture algorithm, the fractured mask data in variable shape beam format;
   receive at least one control parameter related to the fractured mask data, the at least one control parameter including a maximum skew error; and perform a filter algorithm with the at least one control parameter as an input that identifies at least one error in the fractured mask data as compared to the unfractured design data other than approximation differences resulting from the fracture algorithm, the at least one error including an edge shift in the fractured mask data as compared to the unfractured design data that is smaller than the maximum skew value.

2. The apparatus of claim 1 wherein the processor is configured to:
compare the fractured mask data to the unfractured design data to generate output data for input to the filter algorithm.

3. The apparatus of claim 2 wherein the processor is configured to compare the fractured mask data to the unfractured design data by:
performing a Boolean XOR operation using the fractured mask data and the unfractured design data as input.

4. The apparatus of claim 2 wherein the output data is a plurality of polygons and wherein the processor is configured to performing the filter algorithm by:
selecting paths composed of all-angle edges resulting from the plurality of polygons;
exploding the paths to form an envelope having parallel edges about a line defined by the unfractured design data; and
removing portions of the plurality of polygons that are within the envelope, wherein remaining portions of the plurality of polygons identify the at least one error in the fractured mask data.

5. The apparatus of claim 4 wherein the at least one control parameter includes a type of the fracture algorithm.

6. The apparatus of claim 5 wherein the type of the fracture algorithm is one of a fracture algorithm that produces only Manhattan-style fractured mask data or a fracture algorithm that produces Manhattan-style fractured mask data and allows edges with 45° angles.

7. The apparatus of claim 2 wherein the output data is a plurality of polygons, the at least one control parameter includes a spacing check cap, and the processor is configured to perform the filter algorithm by:
for each of the plurality of polygons including parallel edges, calculating a first spacing between the parallel edges;
removing any of the plurality of polygons where the first spacing is below the spacing check cap; and
for each of the plurality of polygons remaining after the removing, calculating a second spacing from an internal edge to a concave corner along a vector perpendicular to the internal edge, wherein any of the plurality of polygons where the first spacing is below the spacing check cap and any of the plurality of polygons where the second spacing is equal to or below the maximum skew error identify the at least one error in the fractured mask error.

8. The apparatus of claim 7 wherein the spacing check cap is equal to 5 times the maximum skew error.

9. The apparatus of claim 2 wherein the output data is a plurality of polygons, the at least one control parameter includes a spacing check cap, and the processor is configured to perform the filter algorithm by:
for each of the plurality of polygons including parallel edges, calculating a first spacing between the parallel edges;
for each of the plurality of polygons not including parallel edges, calculating a second spacing from an internal edge to a concave corner along a vector perpendicular to the internal edge;
identifying any of the plurality of polygons where the first spacing or the second spacing is below the spacing check cap; and
reducing the second spacing by the maximum skew error for any of the plurality of polygons not including parallel edges where the second spacing is below the spacing check cap to generate a third spacing, wherein any of the plurality of polygons where the first spacing is below the spacing check cap and any of the plurality of polygons where the third spacing is above zero identify the at least one error in the fractured mask error.

10. The apparatus of claim 9 wherein the spacing check cap is equal to 5 times the maximum skew error.

11. The apparatus of claim 1 wherein the at least one control parameter includes a spacing check cap, and the processor is configured to perform the filter algorithm by:
aligning the unfractured design data with the fractured mask data;
selecting paths composed of all-angle edges formed by the aligned data;
exploding the paths to form an envelope having parallel edges about a line defined by the unfractured design data; and
selecting any edges outside of the envelope and present in either the unfractured design data or the fractured mask data, but not both, wherein the selected edges identify the at least one error in the fractured mask error.

12. The apparatus of claim 11 wherein the at least one control parameter includes a type of the fracture algorithm and the spacing check cap is equal to 5 times the maximum skew error.

13. The apparatus of claim 1 wherein the at least one error includes at least one of a slit skew greater than the maximum skew error, an addition of a polygon to the fractured mask data not needed based on the fracture algorithm and the unfractured design data or an omission of a polygon from the fractured mask data needed based on the fracture algorithm and the unfractured design data.

14. A non-transitory computer-readable storage medium storing instructions that, when executed by a processor, perform the steps of:
receiving fractured mask data and unfractured design data from which the fractured mask data was generated using a fracture algorithm, the fractured mask data in variable shape beam format;
receiving at least one control parameter related to the fractured mask data, the at least one control parameter including a maximum skew error; and
performing a filter algorithm with the at least one control parameter as an input that identifies at least one error in the fractured mask data as compared to the unfractured design data other than approximation differences resulting from the fracture algorithm, the at least one error including an edge shift in the fractured mask data as compared to the unfractured design data that is smaller than the maximum skew value.

15. The non-transitory computer-readable storage medium of claim 14 wherein the at least one error includes at least one of a slit skew greater than the maximum skew error, an addition of a polygon to the fractured mask data not needed based on the fracture algorithm and the unfractured design data or an omission of a polygon from the fractured mask data needed based on the fracture algorithm and the unfractured design data.

16. The non-transitory computer-readable storage medium of claim 14 wherein the at least one control parameter includes a spacing check cap and a type of the fracture algorithm, and further comprising instructions that, when executed by the processor, perform the steps of:
aligning the unfractured design data with the fractured mask data;
selecting paths composed of all-angle edges formed by the aligned data;
exploding the paths to form an envelope having parallel edges about a line defined by the unfractured design data; and
selecting any edges outside of the envelope and present in either the unfractured design data or the fractured mask data, but not both, wherein the selected edges identify the at least one error in the fractured mask error.

17. The non-transitory computer-readable storage medium of claim 16, further comprising an instruction that, when executed by the processor, performs the step of:
generating the spacing check cap by multiplying the maximum skew error by 5; and wherein the type of the fracture algorithm is one of a fracture algorithm that produces only Manhattan-style fractured mask data or a fracture algorithm that produces Manhattan-style fractured mask data and allows edges with 45° angles.

18. The non-transitory computer-readable storage medium of claim 14, further comprising instructions that, when executed by the processor, perform the steps of:
executing a Boolean XOR operation using the fractured mask data and the unfractured design data as input; and
performing the filter algorithm using an output of the Boolean XOR operation.

19. The non-transitory computer-readable storage medium of claim 18 wherein the output of the Boolean XOR operation is a plurality of polygons, the at least one control parameter includes a type of the fracture algorithm, and further comprising instructions that, when executed by the processor, perform the step of performing the filter algorithm by:
selecting paths composed of all-angle edges resulting from the plurality of polygons;
exploding the paths to form an envelope having parallel edges about a line defined by the unfractured design data; and
removing portions of the plurality of polygons that are within the envelope, wherein remaining portions of the plurality of polygons identify the at least one error in the fractured mask data.

20. A method, comprising:
receiving fractured mask data and unfractured design data from which the fractured mask data was generated using a fracture algorithm, the fractured mask data in variable shape beam format;
receiving at least one control parameter related to the fractured mask data, the at least one control parameter including a maximum skew error; and
performing, using a processor, a filter algorithm with the at least one control parameter as an input that identifies at least one error in the fractured mask data as compared to the unfractured design data other than approximation differences resulting from the fracture algorithm, the at least one error including an edge shift in the fractured mask data as compared to the unfractured design data that is smaller than the maximum skew value.

* * * * *